E. R. STOEKLE.
MEANS FOR REGULATING ALTERNATING CURRENTS.
APPLICATION FILED NOV. 10, 1917.
1,360,462.
Patented Nov. 30, 1920.
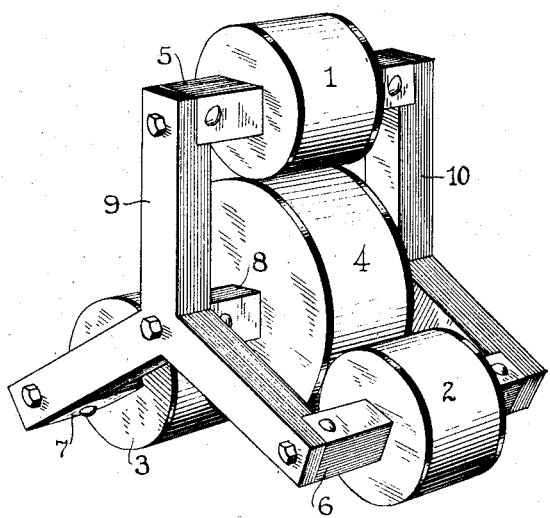

UNITED STATES PATENT OFFICE.

ERWIN R. STOEKLE, OF MILWAUKEE, WISCONSIN, ASSIGNOR TO THE CUTLER-HAMMER MFG. CO., OF MILWAUKEE, WISCONSIN, A CORPORATION OF WISCONSIN.

MEANS FOR REGULATING ALTERNATING CURRENTS.

1,360,462.     Specification of Letters Patent.     Patented Nov. 30, 1920.

Application filed November 10, 1917. Serial No. 201,205.

*To all whom it may concern:*

Be it known that I, ERWIN R. STOEKLE, a citizen of the United States, residing at Milwaukee, in the county of Milwaukee and State of Wisconsin, have invented new and useful Improvements in Means for Regulating Alternating Currents, of which the following is a full, clear, concise, and exact description, reference being had to the accompanying drawing, forming a part of this specification.

This invention relates to means for regulating alternating currents and more particularly polyphase currents.

It has heretofore been proposed to regulate a single phase current by an inductive coil having a magnetic core, the permeability of which is variable by an exciting coil, usually a direct current coil, the latter coil being so arranged that its magnetic flux passes through said magnetic core. Also, it has been proposed to arrange the inductive coil and the exciting coil relative to the magnetic core for zero mutual inductance to thereby prevent the induction of a high voltage in the exciting coil.

The present invention relates to regulating means embodying the same principle of regulation and has among its objects to provide a simple and efficient regulator for polyphase alternating currents.

A further object is to provide regulating means suitable for polyphase alternating currents which may be embodied in a simple and compact structure and one which will obviate the necessity for zero mutual inductance of the inductive and exciting coils.

Other objects and advantages of the invention will hereinafter appear.

The invention may in practice be embodied in various forms, one of which is illustrated in the accompanying drawing now to be described.

Referring to the drawing, the same shows in perspective a regulator particularly designed for a symmetrical three phase alternating current circuit and includes inductive coils 1, 2 and 3 and an exciting coil 4. The coils 1, 2 and 3 are provided with cores 5, 6 and 7 respectively and the coil 4 with a core 8, said cores being secured to and connected by Y-shaped members 9 and 10 to provide a unitary magnetic frame with the cores 5, 6 and 7 arranged symmetrically about the core 8. The several cores and the end members are shown as formed of laminations.

The coils 1, 2 and 3 are provided for connection, each in a different phase of the circuit to be controlled and to produce magnetic fluxes of substantially equal phase displacement with respect to each other. Thus with the coils 1, 2 and 3 mounted upon a magnetic frame, such as illustrated, the fluxes of said coils, while traversing the common core member 8, will combine to give a negligible resultant a. c. flux in said common core member. Accordingly the exciting coil 4 will be duly protected against an alternating voltage even though it may be said to have a mutual inductance with each of the alternating current coils. On the other hand, the magnetic frame directs the flux of the exciting coil through the cores of the several a. c. coils, thereby providing for variations of the permeability of said cores by regulation of the exciting coil, as heretofore proposed.

Accordingly the device illustrated provides for the control of a large three phase alternating current through the coils 1, 2 and 3 with the expenditure of a relatively small amount of energy in the exciting coil 4, which may be energized by direct current. And while the device illustrated is particularly designed for regulation of a three phase current, it will be apparent that by increasing the number of a. c. coils and cores and preserving the same general arrangement of cores, the device may be adapted to currents of any number of phases.

What I claim as new and desire to secure by Letters Patent is:

1. In a regulator for polyphase alternating current circuits, in combination, a plurality of inductive coils, an exciting coil and means providing a closed magnetic circuit for each of said inductive coils threading said exciting coil whereby the magnetic flux of the latter coil traverses each of said circuits, all of said inductive coils being of different phase and producing magnetic fluxes having a phase relation whereby the effect thereof on said exciting coil is rendered negligible.

2. In a regulator for polyphase alternating current circuits, in combination, a plurality of coils certain being exciting and others inductive, and means affording closed magnetic circuits between the former and the latter of said coils to subject the latter to the inductive influence of the former, each of the latter coils being of different phase and producing magnetic fluxes bearing a phase relation whereby the effect thereof upon the former of said coils is rendered negligible.

3. In a regulator for polyphase alternating currents, the combination with a plurality of inductive coils, one for each phase, of means affording magnetic circuits for said coils and including a magnetic member common thereto, the resultant of the fluxes of said coils which traverse said member being negligible and an exciting coil for magnetizing said common magnetic member.

4. In a regulator for symmetrical polyphase alternating currents, the combination with a plurality of inductive coils, one for each phase, and each having a magnetic core, of an exciting coil having a magnetic core common to the magnetic circuits of all of said inductive coils and means for supporting said inductive coils in a substantially equally spaced relation with respect to said exciting coil whereby the fluxes of the former coils being of substantially equal phase displacement will combine to give a negligible resultant flux in the core of the latter coil.

In witness whereof, I have hereunto subscribed my name.

ERWIN R. STOEKLE.